United States Patent
Meng

(10) Patent No.: US 12,185,698 B2
(45) Date of Patent: Jan. 7, 2025

(54) INTEGRATED INCUBATOR WITH AUTOMATIC WATER FILLING AND HUMIDIFYING DEVICE

(71) Applicant: Dezhou Weiqian Import and Export Co., LTD, Shandong (CN)

(72) Inventor: Dehua Meng, Shandong (CN)

( * ) Notice: Subject to any disclaimer, the term of this patent is extended or adjusted under 35 U.S.C. 154(b) by 21 days.

(21) Appl. No.: 18/149,032

(22) Filed: Dec. 30, 2022

(65) Prior Publication Data
US 2024/0138378 A1 May 2, 2024

(51) Int. Cl.
*A01K 41/04* (2006.01)
*A01K 41/06* (2006.01)

(52) U.S. Cl.
CPC .............. *A01K 41/04* (2013.01); *A01K 41/06* (2013.01)

(58) Field of Classification Search
CPC ........ A01K 41/04; A01K 41/06; A01G 41/04; A01G 41/06
See application file for complete search history.

(56) References Cited

U.S. PATENT DOCUMENTS

| | | | | |
|---|---|---|---|---|
| 1,214,780 A * | 2/1917 | Harp | ...................... | A01K 1/033 119/498 |
| 1,460,349 A * | 6/1923 | Oakes | ..................... | A01K 41/00 119/319 |
| 3,088,436 A * | 5/1963 | Lyon | ..................... | A01K 41/00 119/319 |
| 3,543,726 A * | 12/1970 | Marsh | ..................... | A01K 41/00 119/319 |
| 3,584,605 A * | 6/1971 | Schwartz | ............. | A01K 41/023 219/442 |
| 3,783,832 A * | 1/1974 | Marsh | ..................... | A01K 41/06 219/400 |
| 3,783,833 A * | 1/1974 | Bailey | .................... | A01K 41/06 119/319 |
| D250,355 S * | 11/1978 | Marsh | ......................... | D30/117 |

(Continued)

FOREIGN PATENT DOCUMENTS

KR 20130026093 A * 3/2013
KR 101312022 B1 * 9/2013

(Continued)

OTHER PUBLICATIONS

MRbrew Bottle Filling Cap (Oct. 19, 2022) retrieved from https://www.amazon.com/MRbrew-Plastic-Carbonation-Homebrew-Pressure/dp/B0BJPQF9SH?th=1 (Year: 2022).*

(Continued)

*Primary Examiner* — Monica L Perry
*Assistant Examiner* — Aaron M Rodziwicz

(57) ABSTRACT

An integrated incubator with automatic water filling and humidifying device, comprising a bottom case, a cover and a top cover, with a controller, detector, humidifier and water-filling unit; the water-filling unit comprises a bottom case cover, a casing, a plug and a limiting post; the plug is provided with a sealing ring at the top and springs in the middle; the upper part of the casing and the sealing ring forms a sealing structure, and the bottom of the casing is provided with a water level opening for water discharge. The casing, the plug, the limiting post and the sealing ring form the water-filling unit, realizing the automatic water operation.

10 Claims, 12 Drawing Sheets

(56) References Cited

U.S. PATENT DOCUMENTS

| | | | | |
|---|---|---|---|---|
| 4,215,651 | A * | 8/1980 | Pearce | A01K 41/06 119/318 |
| 4,274,364 | A * | 6/1981 | Forseth | A01K 41/04 119/300 |
| 4,606,299 | A * | 8/1986 | Grumbach | A01K 41/04 119/314 |
| 5,148,773 | A * | 9/1992 | Ontiveros | A01K 41/00 119/319 |
| 7,261,860 | B1 * | 8/2007 | Vellinger | B04B 5/02 422/50 |
| D722,209 | S * | 2/2015 | Carlin, Jr. | D30/117 |
| D814,127 | S * | 3/2018 | Bae | D30/117 |
| 11,819,009 | B1 * | 11/2023 | Wang | A01K 41/06 |
| 2016/0135434 | A1 * | 5/2016 | Bodenhamer | A01K 41/023 119/318 |
| 2017/0009202 | A1 * | 1/2017 | Ramsing | C12N 5/0604 |
| 2019/0208749 | A1 * | 7/2019 | Clark, Jr. | A01K 41/06 |
| 2019/0335717 | A1 * | 11/2019 | Zhao | A01K 41/06 |
| 2019/0335718 | A1 * | 11/2019 | Zhao | A01K 41/06 |

FOREIGN PATENT DOCUMENTS

| | | | | |
|---|---|---|---|---|
| KR | 20130134427 A | * | 12/2013 | |
| KR | 101397492 B1 | * | 5/2014 | |
| WO | WO-2019213659 A1 | * | 11/2019 | A01K 41/04 |

OTHER PUBLICATIONS

Bottle Cap plug with spring (Year: 2022).*

* cited by examiner

INTEGRATED INCUBATOR WITH AUTOMATIC WATER FILLING AND HUMIDIFYING DEVICE

1. TECHNICAL FIELD

The disclosure relates to the field of breeding technology, in particular to an integrated incubator with automatic water filling and humidifying device.

2. BACKGROUND ART

With the improvement of people's living standards, the demand for poultry has gradually increased. With the development of modern technology, poultry farming has also started to apply some modern equipment. Many farms have started to apply incubators for poultry egg incubation. It is necessary to humidify the internal environment during the use of the incubator to ensure the humidity of the environment meets the hatching conditions.

Large-scale breeding farms generally apply large incubators for hatching egg. Although with high work performance of large incubators, they are huge, expensive and complex to operate. However, with the unclear development direction and insufficient starting capital of the small-scale breeders, it is necessary to experience the small breeding trial of many non-local poultry before the large number introduction. Therefore, there will be relatively high cost for the direct purchase of large incubators, and such large incubators are not suitable for small-scale breeders.

Although there are some small incubators on the market for small-scale breeders to carry out small breeding trial; for instance, the patent CN20721855526.3 provides an incubator comprising a box body and a box lid closed on the opening of the box body; the box body is provided with a control device, egg turning device, humidifying device, temperature control device and heat dissipation device; egg turning device comprises a supporting frame, a plurality of rollers and a driving mechanism, the driving mechanism is electrically connected to the control device; one end of the supporting frame is provided against the bottom plate of the box, and the humidifying device comprises a humidity sensor, a water reception basin and a water inlet pipe; the humidity sensor is electrically connected to the control device, the water reception basin is provided between the bottom plate of the box and the supporting frame, the water reception basin is connected to the water filling holes through the water inlet pipe; The temperature control device comprises a temperature sensor and a heater, and the temperature sensor and the heater are electrically connected to the control device, and the heat dissipation device comprises a cooling fan, and the cooling fan is electrically connected to the control device.

However, the above devices and existing incubators are equipped with liquid level sensors or humidity sensors to sense the internal humidity or water volume, with the requirement of staff to manually carry out water refilling operations.

The humidifier is usually provided inside, which requires the staff to estimate the approximate amount of water to be added when adding water; the adding less water will result in insufficient humidity to affect hatching, while adding more water will result in too much humidity inside, also affecting hatching; therefore, there is a problem of poor control of the amount of water added manually.

Moreover, the manual way to add water requires the staff to confirm the incubator from time to time to ensure that water can be added in a timely manner. However, the incubator usually uses a large amount of water, which requires the staff to frequently carry out water refilling operations, and for farms, a large number of incubators operating at the same time requires the staff to spend a lot of time and energy on the mechanical and repetitive work of adding water, which seriously affects the staff's other work, also causing a great deal of labor.

Therefore, the existing incubators have the problem of using manual methods to add water, which cannot be effectively controlled and has a large labor burden on the staff.

3. SUMMARY OF THE INVENTION

To solve the above problems and achieve the above object, the disclosure provides an integrated incubator with automatic water filling and humidifying device, which adopts mechanical structure for automatic water injection instead of traditional manual water filling, to realize the effective control of water filling and relatively low labor burden of staff.

The disclosure provides the following technical solutions: An integrated incubator with automatic water filling and humidifying device, wherein comprises a bottom case, a cover provided on the bottom case and a top cover provided on the cover; the top cover is provided with a controller, a detector is provided in the cover, a humidifier for humidifying is provided on the bottom case, and a water-filling unit for automatic water filling is provided on the side of the bottom case; the controller is provided in connection with the detector and the humidifier respectively.

The water-filling unit comprises a bottom case cover, a casing provided on the bottom case cover for installing a water storage bottle, a plug provided in the casing to move up and down and a limit post correspondingly provided below the plug; the top of the plug passes through the upper part of the casing and is connected with a sealing ring; the plug is provided with springs positioned in the lower part of the casing; the upper part of the casing corresponds to the sealing ring to form a sealing structure, and the bottom of the casing is provided with a water level opening for water discharge.

The cover is provided with heating units for heating, a turning plate for placing the eggs 9 and a rotating unit for driving the rotation of the turning plate; the top cover is provided with a controller, and the controller is respectively provided in connection with the heating units and the rotating unit.

The upper piece for mounting the heating units and rotating units is provided in a fixed position under the cover; the upper piece is provided with a downward mounting groove in the middle and a number of guiding sheets in the upper part along the circumference; the side walls of the mounting groove are provided with a number of air outlets.

The heating units are provided on the mounting groove and comprise a fan fixing holder, a fan inside the fan fixing holder and wire-winding posts distributed on the four corners of the outside of the fan fixing holder; the wire-winding posts and the fan fixing holder are wound with heating wires.

The rotating unit comprises a motor provided in the mounting groove and shaft connecting blocks provided under the mounting groove and in connection with the output shaft of the motor; the turning plate is provided with a rotating base correspondingly connected to the shaft connecting blocks in the middle, and the shaft connecting blocks and the rotating base are provided in corresponding connection.

The bottom case is provided with a water tank connected with the water-filling unit, and the humidifier is provided in the middle of the bottom case and is provided in the water tank; the water tank is provided with a water tank cover; the limiting post is provided in the water tank.

The bottom case is provided with a middle plate for mounting the turning plate, and the middle of the middle plate is provided with a mounting base for corresponding to the turning plate; the middle plate is evenly provided with holes for ventilation.

The top cover is provided with an egg light and a power supply port connected to the controller; the cover is made of transparent material and is provided above with an openable air release valve.

The detector comprises a temperature detector and a humidity detector; the controller is provided in connection with the humidifier through the power supply wire for supplying power.

A plurality of egg holders for placing eggs are evenly distributed on the turning plate.

Compared with the existing technology, the disclosure provides the bottom case, the cover and the top cover to form a chamber for hatching eggs, and the casing, the plug, the limiting post and the sealing ring to form a water-filling unit for automatic water filling; the water storage bottle is provides for pre-filling water, and the combination of lifting plug and the limiting post to achieve the opening and closing of the sealing structure between the sealing ring and the casing to achieve automatic water filling and automatic water stopping; the specific operation is as follows: using the water storage bottle and its own gravity of the water to put the casing and plug down, and the plug will be stopped by the limiting post during the downward process, to prevent the plug from continuing to be pressed down; the seal is disconnected from the casing which continues to be pressed down, and the water storage bottle is automatically filled into the sink to achieve automatic water filling; and when the water level in the sink is at the equal level of the water level opening, the air cannot enter the water storage bottle, thus achieving automatic water stop.

The application attempts to realize the control of the amount of adding water by adding the water level opening at the bottom of the casing, to ensure that the water level will stop adding water once it rises to the predetermined level, and precisely control the amount of water added to eliminate the situation of adding too little or too much water, and to further ensure an appropriate egg hatching environment and to improve the hatchability.

The entire process of adding and stopping water does not require the manual operation of staff, but only requires to pre-fill the water storage bottle and replace the bottle in due time to achieve automatic water filling operation of the incubator, thus to significantly reduce the manual working volume and labor burden, allowing additional time and energy to manage other issues and create greater value.

Therefore, the application adopts mechanical structure for automatic water injection instead of traditional manual water filling, to realize the effective control of water filling and relatively low labor burden of staff.

Further, the water storage bottle of the application is not limited to the matching water storage bottle but can be used as a water storage bottle by using ordinary water bottles, plastic bottles that can be installed; and without the direct installation, the water storage bottle can be transferred by adding a common threaded adapter tube, realizing the convenient application.

Through the casing, the plug, the limiting post and the sealing ring to form a water-filling unit for automatic water filling, using a simple and ingenious mechanical structure combined with purely mechanical operation to achieve automatic water filling and automatic stop operation. Compared to other incubators requiring the application of a series of electronic control technology including controllers, valves and sensors, the application provides a relatively uncomplicated structure and lower construction cost, enabling high economic efficiency and easy promotion.

4. BRIEF DESCRIPTION OF ACCOMPANY DRAWINGS

In the figures; 1. the bottom case; 11. the cover; 12. the top cover; 13. the egg light; 14. the air release valve; 15. the power supply port; 16. the controller; 17. the detector; 18. the water tank; 181. the limiting post; 19. the water tank cover; 21. the upper piece; 211. the mounting groove; 212. the air outlets; 213. the guiding sheets; 22. the turning plate; 221. the rotating base; 222. the egg holders; 23. the middle plate; 231. the holes; 232. the mounting base; 3. the heating units; 31. the fan fixing holder; 32. the fan; 33. the wire-winding posts; 34. the heating wires; 4. the rotating unit; 41. the motor; 42. the shaft connecting blocks; 5. the humidifier; 6. the water-filling unit; 61. the bottom case cover; 62. the casing; 621. the water level opening; 63. the plug; 64. the sealing ring; 65. the springs; 9. the water storage bottle; 91. the eggs.

5. SPECIFIC EMBODIMENT OF THE INVENTION

A further detailed description of the invention is given below in combination with the accompanying drawings and embodiments provided by the invention, and the embodiments are exemplary and not the limitations of the scope of the disclosure.

Figure 1:
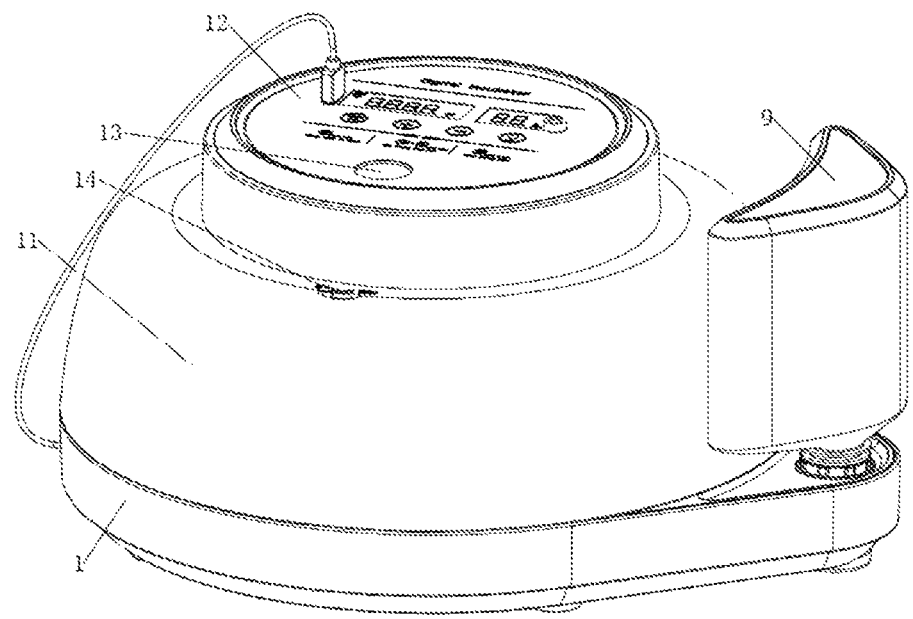
FIG. 1 is a schematic diagram showing the structure of the disclosure.
Figure 3:
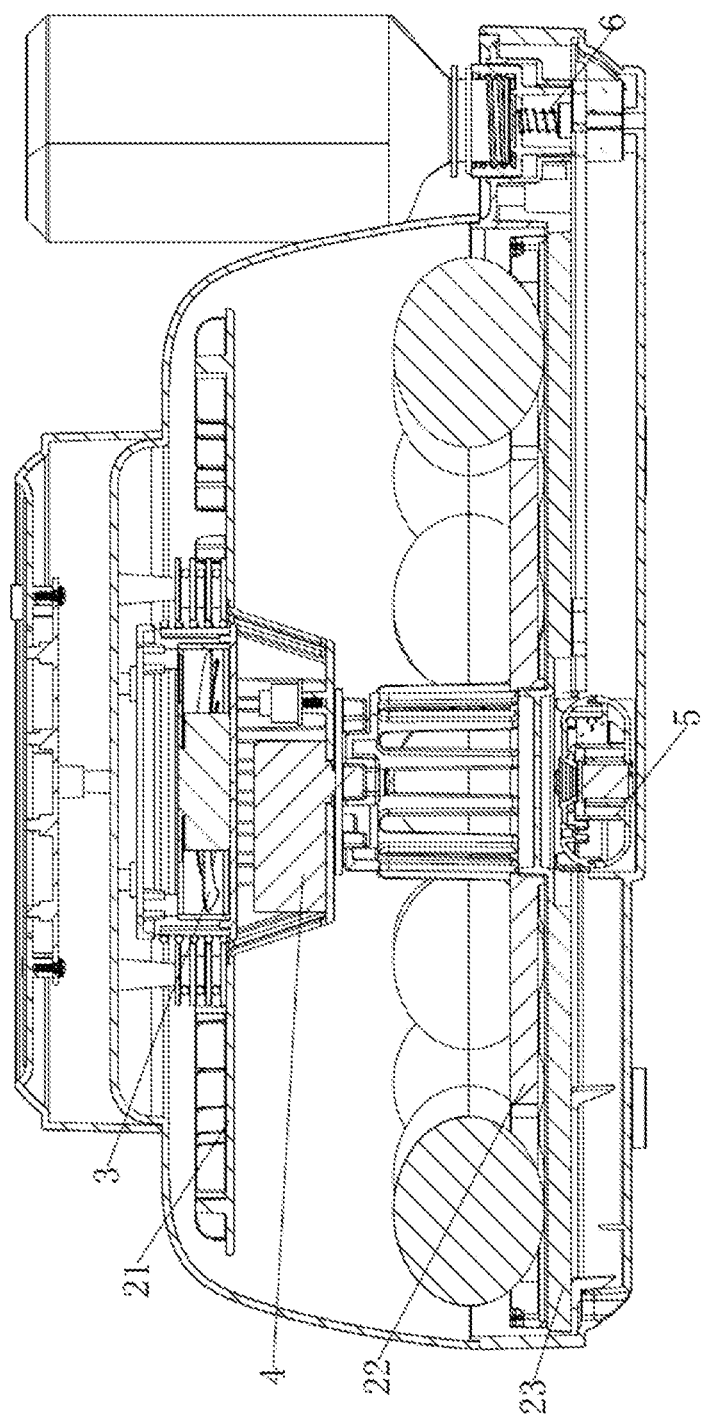
FIG. 3 is a schematic diagram showing the front sectional view of the disclosure.
Figure 4:
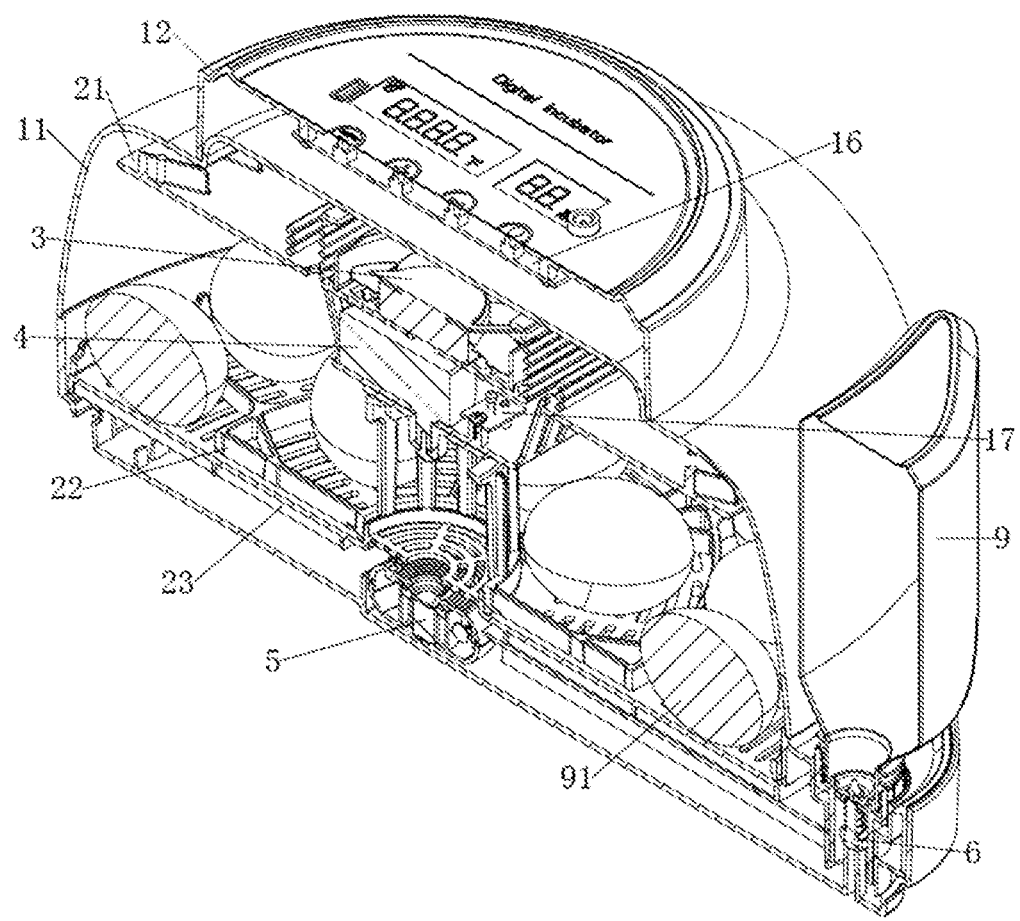
FIG. 4 is a schematic diagram showing the isometric side cross-sectional view of the disclosure.

Referring to the FIG. 1, FIG. 3 and FIG. 4, the embodiment provides an integrated incubator with automatic water filling and humidifying device. Its main body comprises the bottom case 1, the cover 11 provided on the bottom case 1 and the upper cover 12 fixed on the cover 11, which constitute an independent chamber with the outside world; the main body comprises heating units 3, turning plate 22, rotating unit 4, humidifier 5, controller 16 and detector 17; the side of the bottom case 1 protrudes outward, and its protrusion is detachable provided with water storage bottle 9 through the water-filling unit, with the water inside the water storage bottle 9.

Referring to the FIG. 12-FIG. 15, the water-filling unit 6 comprises a bottom case cover 61, a casing 62 provided on the bottom case cover 61, a plug 63 vertically provided in the casing 62 and a limiting post 181 provided at the bottom of the water tank 18 and corresponding vertically to the plug 63; the interior of the casing 62 is divided into two parts by a horizontal partition, and the plug 63 is provided through the partition at the top of the casing 62 with a sealing ring 64, and the plug 63 at the bottom of the casing 62 is provided with springs 65, allowing the plug 63 to move up and down inside the casing 62; the upper part of the casing 62 corresponds to the sealing ring 64 to form a sealing structure, and the sealing structure is opened by the upward movement of the plug 63 which drives an upward movement of the sealing ring 64; the bottom of the casing 62 is provided with a water level opening 621 for water discharge.

The casing 62 can be connected to the water bottle 9 by means of threads; the sealing ring 64 is a commercially available silicone sealing ring.

The heating units 3 are located between the cover 11 and the bottom case 1, blowing hot air from top to bottom for heating; the turning plate 22 is located on the bottom case 1, which is driven by the rotating unit 4 above to drive the rotation of the eggs 91; the controller 16 is located inside the top cover 12, and the detector 17 is located inside the cover 11; the controller 16 is connected with the heating units 3, the rotating unit 4, the detector 17 and the humidifier 5 respectively, to detect the temperature and humidity inside in real time, thus controlling the humidifier 5 and the heating units 3 for humidification and heating.

Figure 5:
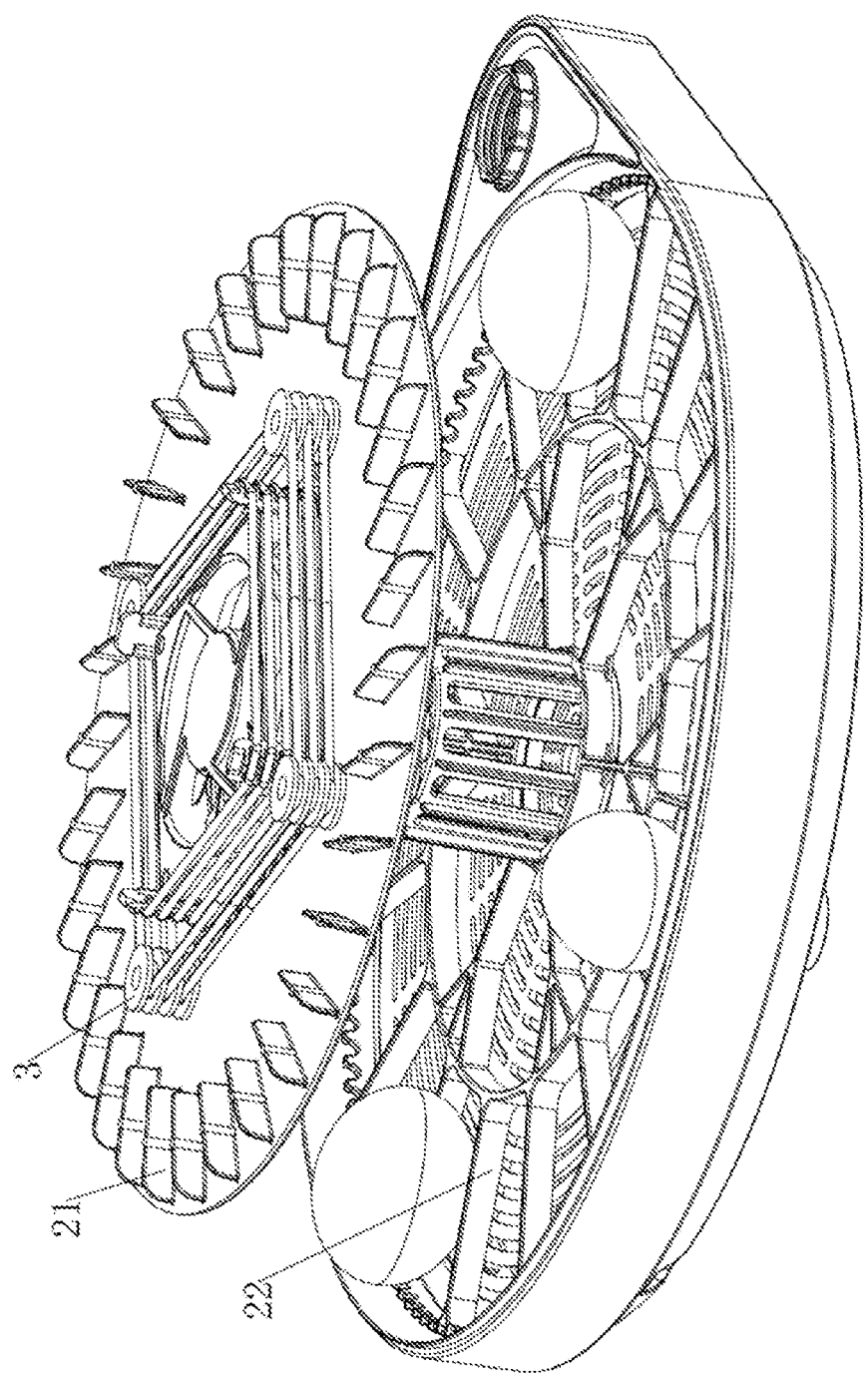
FIG. 5 is a schematic diagram showing the structure of the interior of the disclosure.
Figure 8:
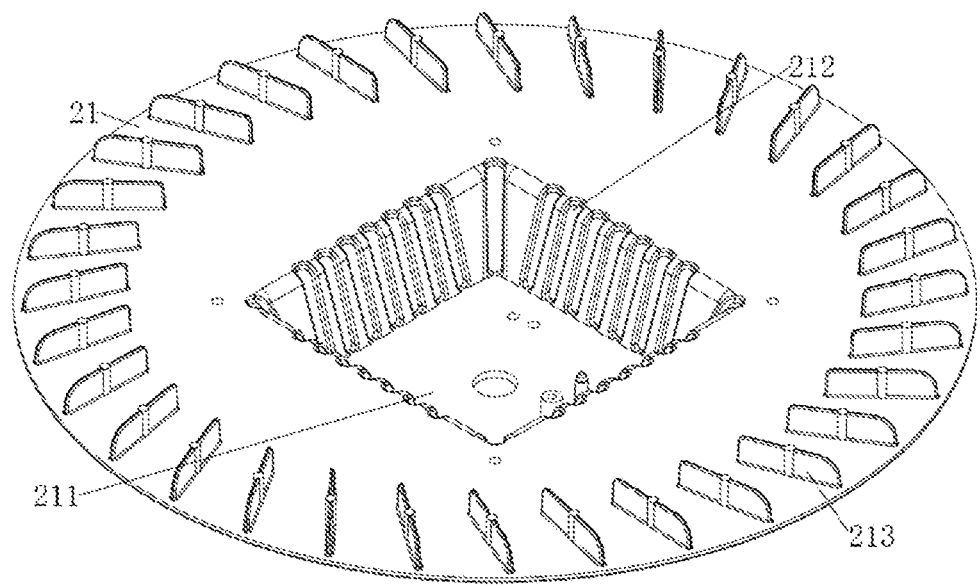
FIG. 8 is a schematic diagram showing the structure of the upper piece of the disclosure.

Referring to the FIG. 5 and FIG. 8, A circular upper piece 21 is provided in a fixed position on top of the interior of the cover 11, providing for the installation of the heating units 3 and the rotating unit 4; the central part of the upper piece 21 is provided in the form of a concave, which is the mounting groove 211 and a number of guiding sheets 213 in the upper part along the circumference; the side walls of the mounting groove (211) are provided with a number of air outlets 212, to facilitate hot air blowing out.

Figure 7:
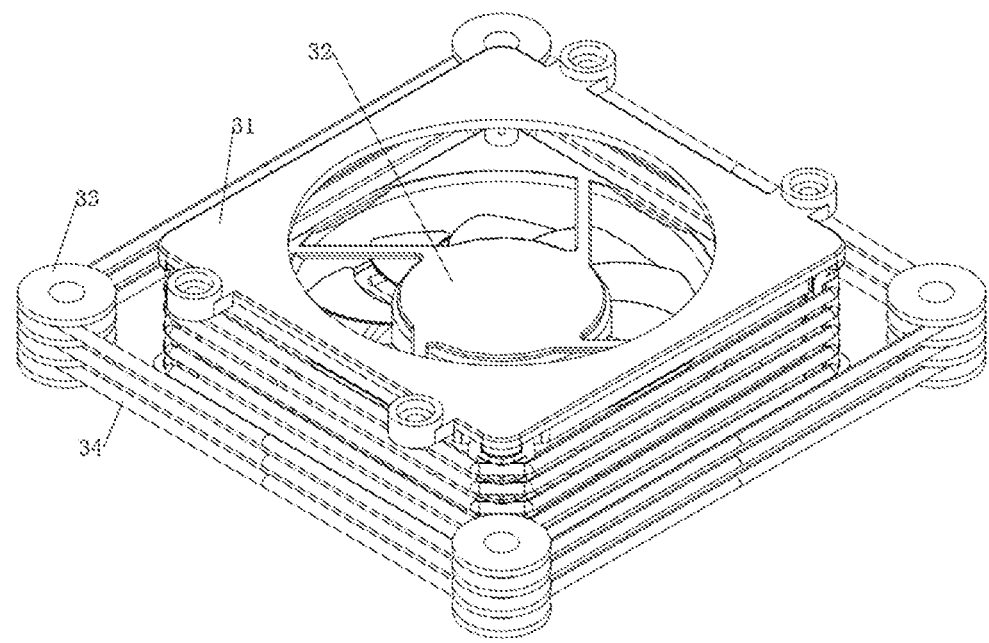
FIG. 7 is a schematic diagram showing the structure of the heating units of the disclosure.

Referring to the FIG. 5 and FIG. 7, the heating units 3 are provided on the mounting groove 211 and screwed to the top of the cover 11; the heating units 3 comprise a fan fixing holder 31, a fan 32 inside the fan fixing holder 31 and wire-winding posts 33 distributed on the four corners of the outside of the fan fixing holder 31; the wire-winding posts 33 and the fan fixing holder 31 are wound with heating wires 34. The eggs are heated by heating wires 34 and then the fan 32 blows hot air underneath to raise the internal temperature and guarantee the incubation temperature of the eggs 91.

Figure 6:
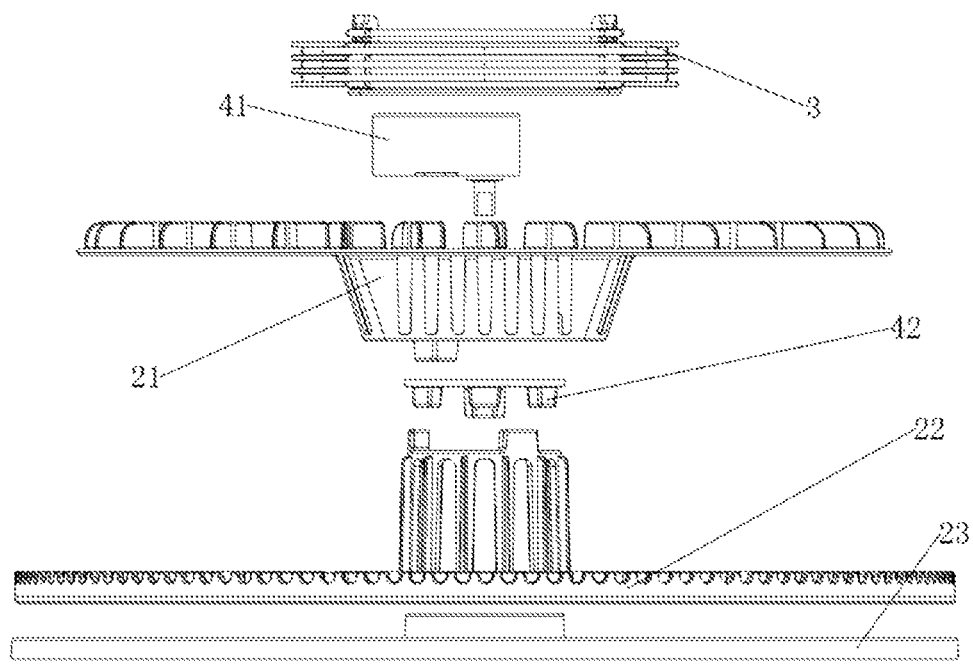
FIG. 6 is a schematic diagram showing the exploded view of the interior of the disclosure.
Figure 9:
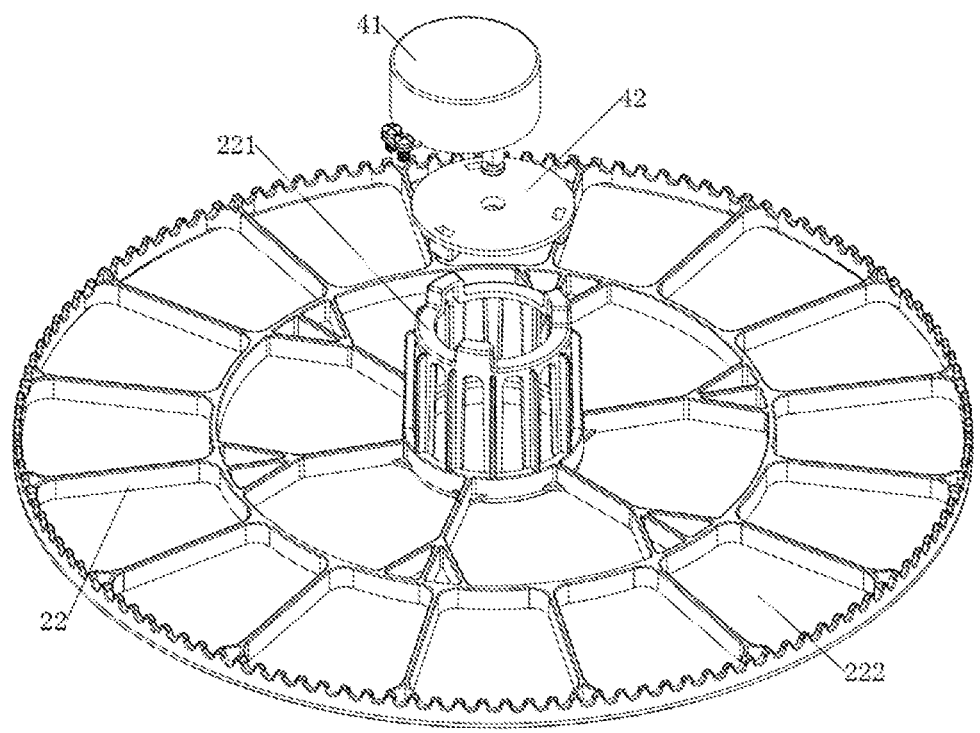
FIG. 9 is a schematic diagram showing the structure of the rotation unit of the disclosure.

Referring to the FIG. 6 and FIG. 9, the rotating unit 4 comprises a motor 41 provided in the mounting groove 211 and shaft connecting blocks 42 provided under the mounting groove 211 and in connection with the output shaft of the motor 41; the turning plate 22 is provided with a rotating base 221 correspondingly connected to the shaft connecting blocks 42 in the middle, and the shaft connecting blocks 42 and the rotating base 221 are provided in corresponding connection. The shaft connecting blocks 42 and the rotating base 221 are each provided with three blocks distributed along the circumference and protruding; the motor 41 drives the shaft connection blocks 42 to rotate the turning plate 22 by the interlocking blocks; the motor 41 is an AC12V permanent magnet synchronous motor.

Figure 10:
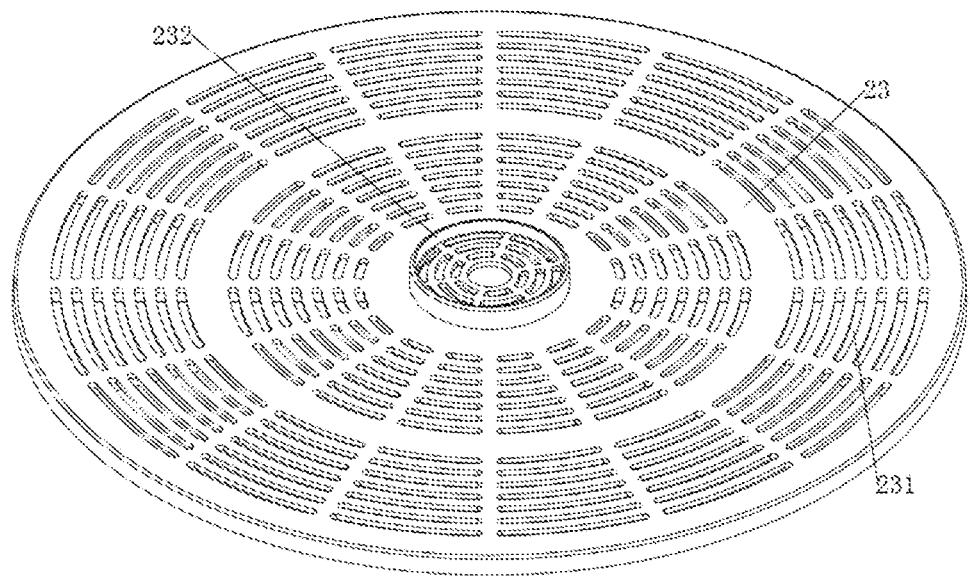
FIG. 10 is a schematic diagram showing the structure of the middle plate of the disclosure.
Figure 11:
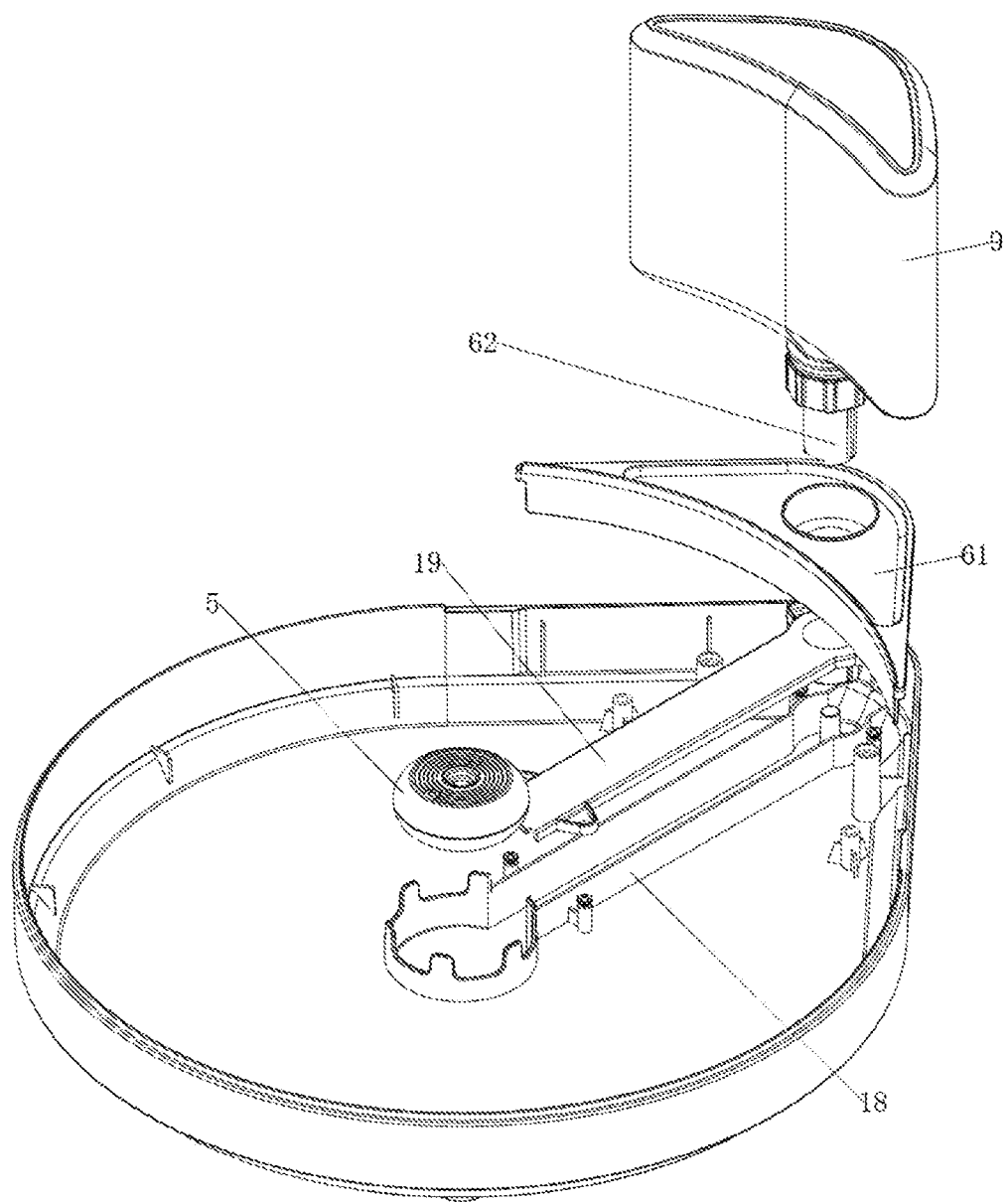
FIG. 11 is a schematic diagram showing the exploded view of the structure of the water-filling unit of the disclosure.
Figure 12:
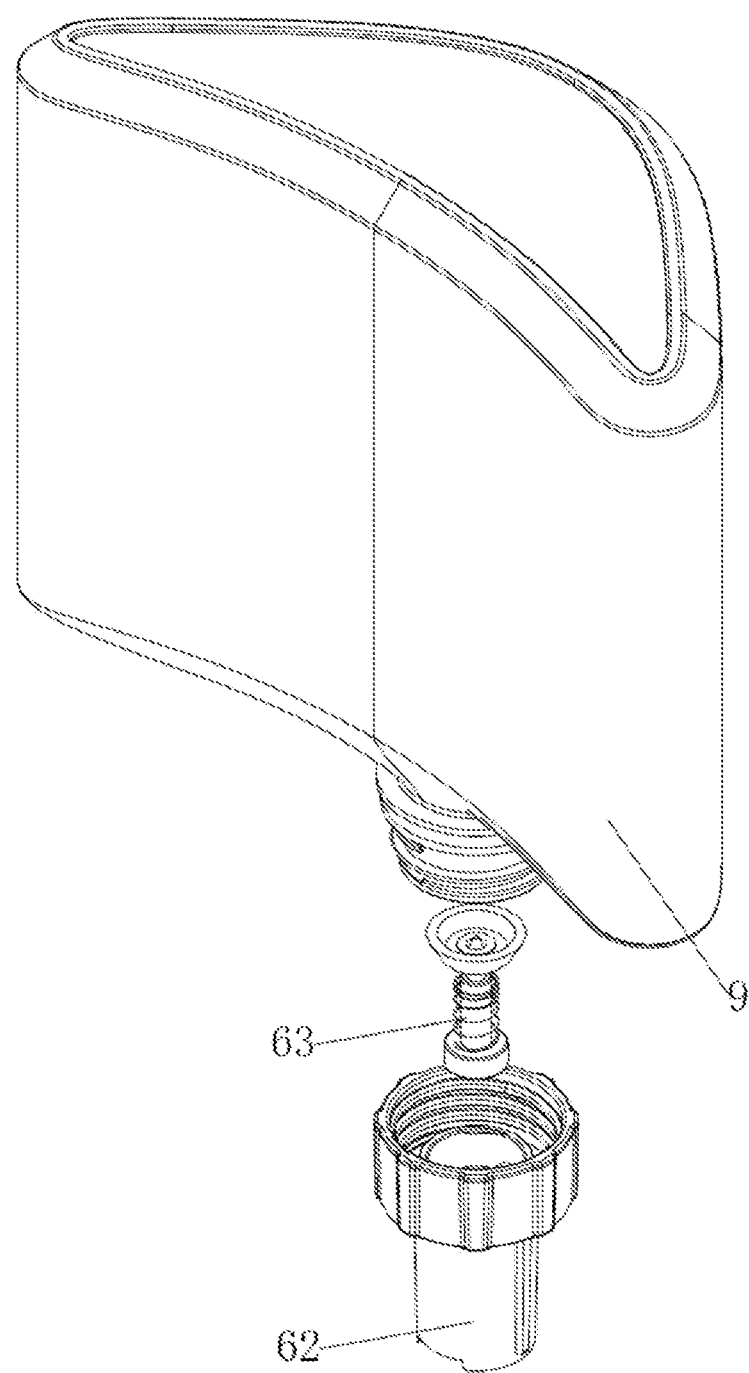
FIG. 12 is a schematic diagram showing the structure of the water-filling unit of the disclosure.
Figure 13:
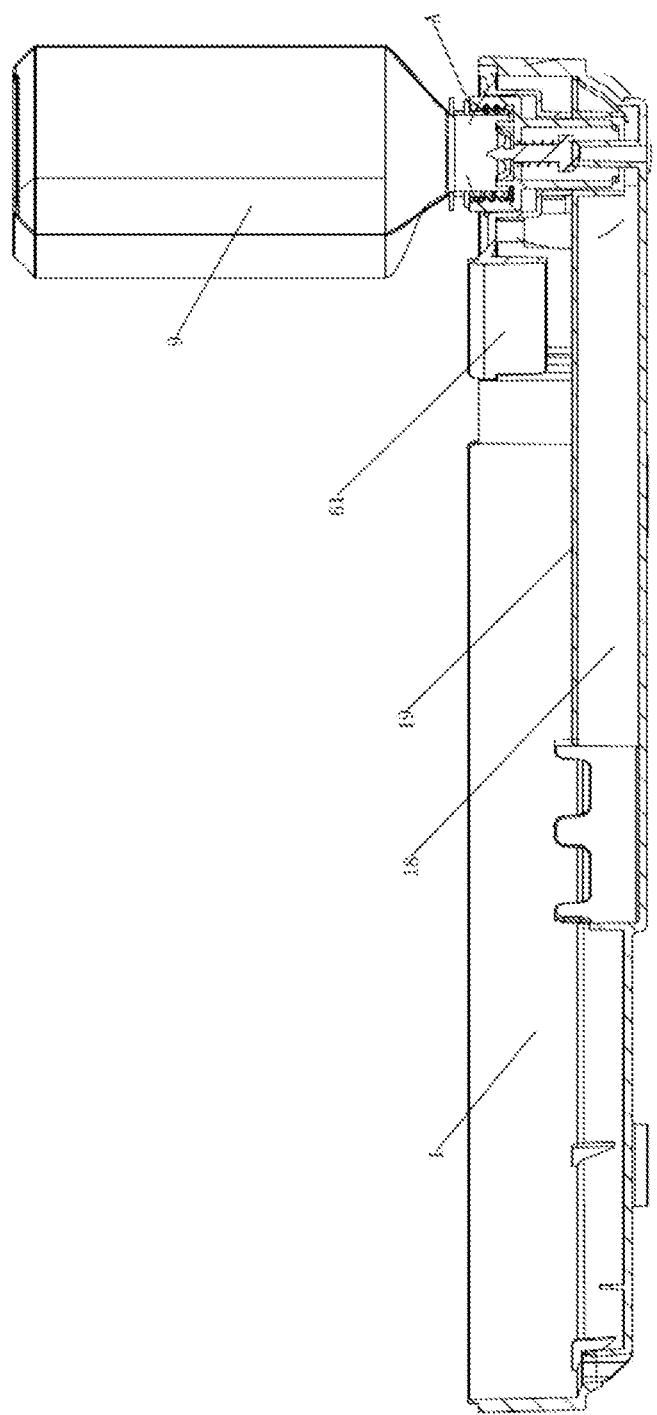
FIG. 13 is a schematic diagram showing the front sectional view of the water-filling unit of the disclosure
Figure 14:
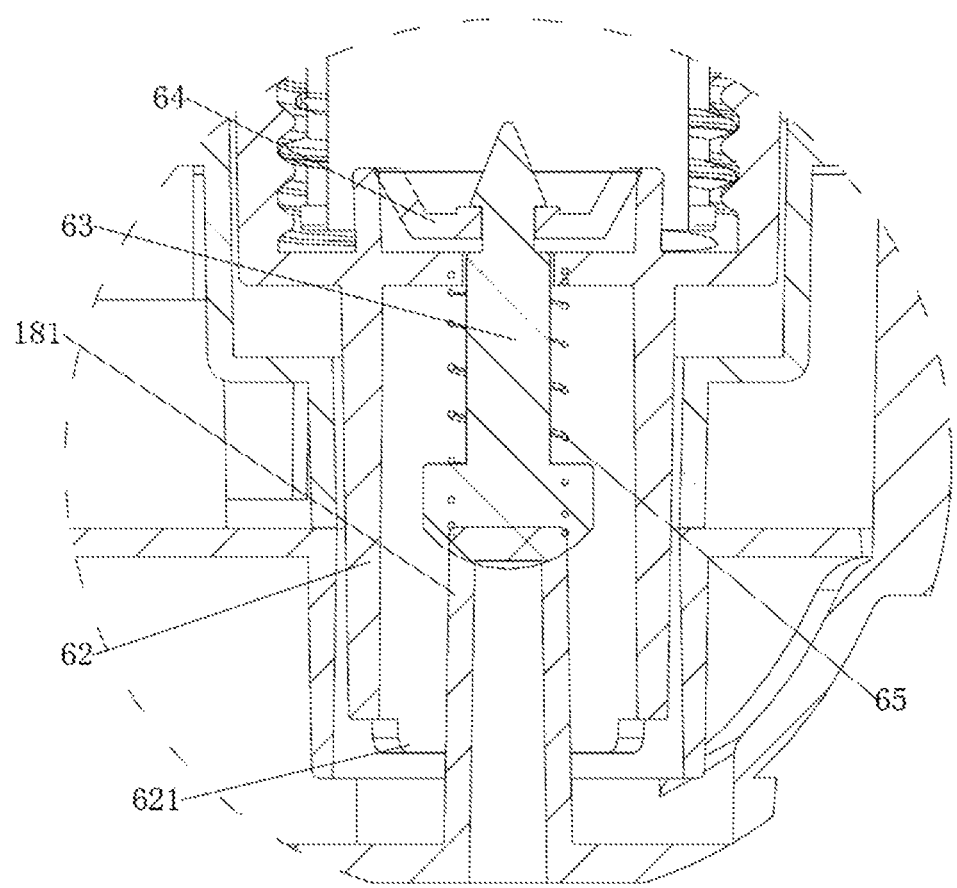
FIG. 14 is a schematic diagram showing the enlarged view at A in FIG. 13.
Figure 15:
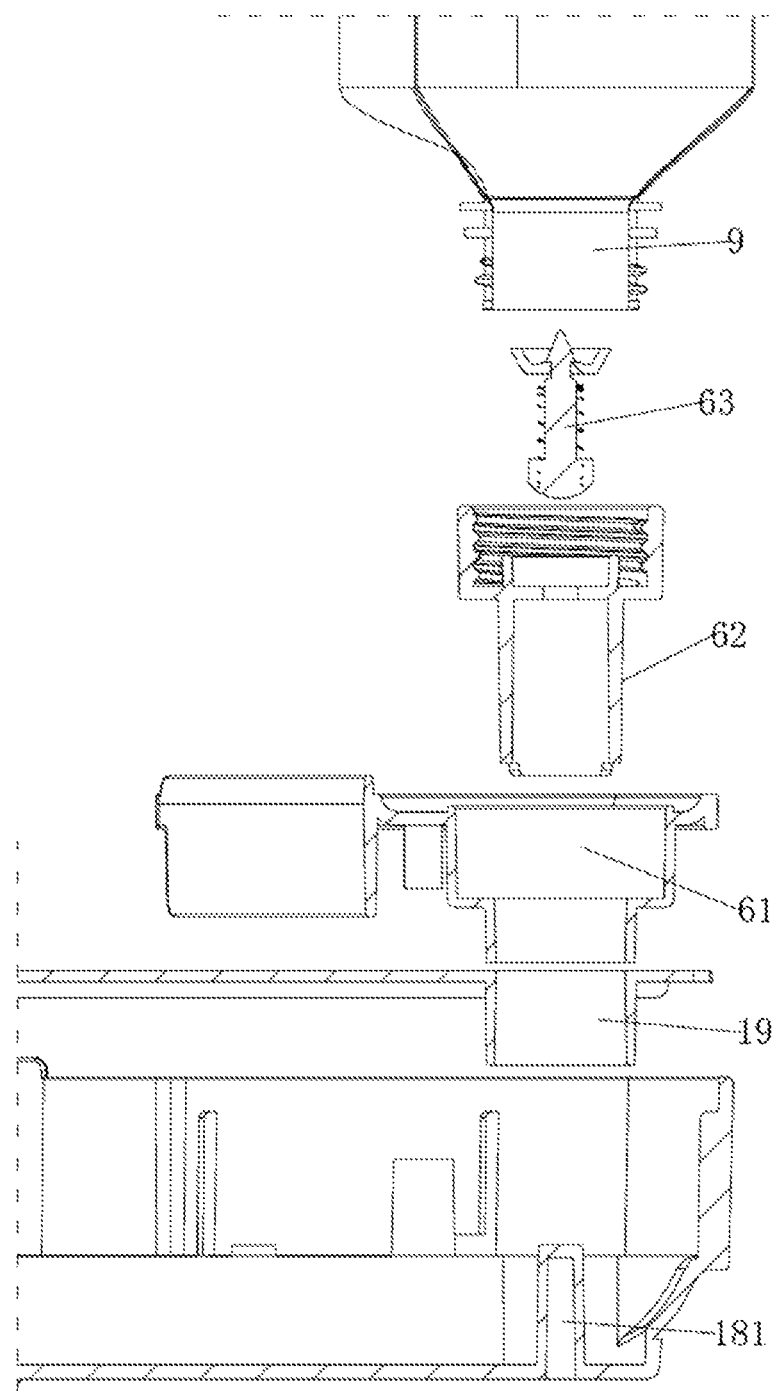
FIG. 15 is a schematic diagram showing the exploded view of the front cross-sectional view of the water-filling unit of the disclosure.

Referring to the FIG. 10 and FIG. 11, the bottom case 1 is provided with a water tank 18 connected with the water-filling unit, and the humidifier 5 is provided in the middle of the bottom case 1 and is provided in the one end of the water tank 18; the water tank 18 is provided with a water tank cover 19; the bottom case 1 is provided with a middle plate 23 for providing the turning plate 22, and the middle of the middle plate 23 is provided with a mounting base 232 for corresponding to the turning plate 22; the middle plate 23 is evenly provided with holes 231 for ventilation.

Figure 2:
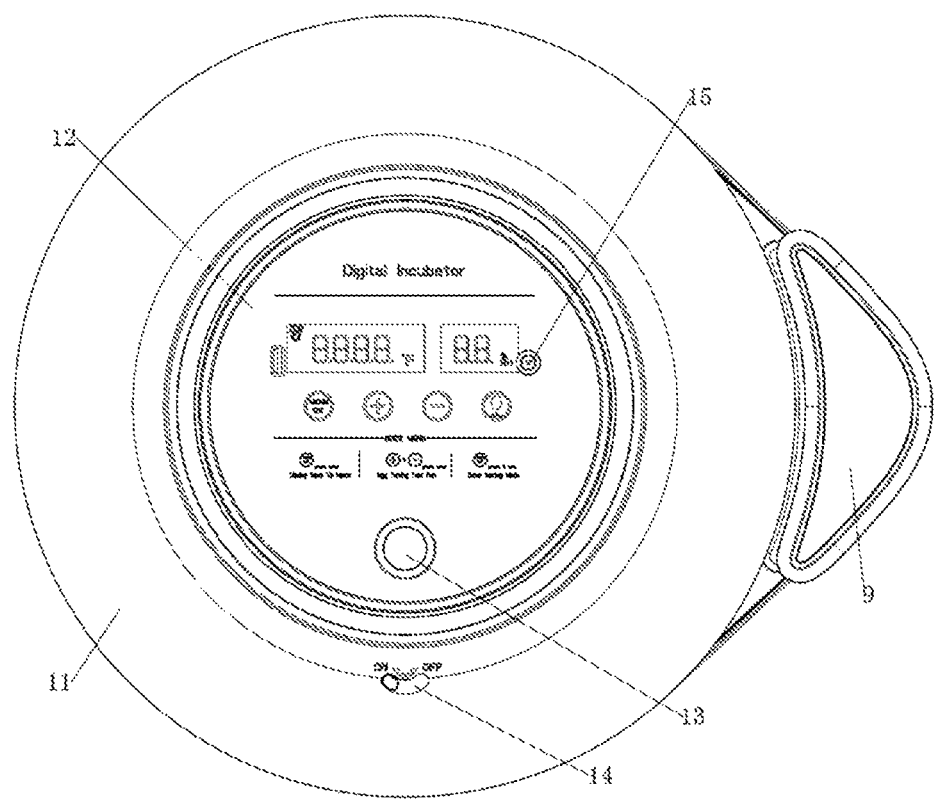
FIG. 2 is a schematic diagram showing the top view of the disclosure.

Referring to the FIG. 1 and FIG. 2, the top cover 12 is provided with an egg light 13 and a power supply port 15 connected to the controller 16; the cover 11 is made of transparent material and is provided above with an openable air release valve 14. The transparent cover 11 is convenient for staff to observe the interior; the egg light 13 provides the necessary lighting for egg incubation; and the display panel is provided to show the temperature and humidity of the interior, allowing staff to visually access the incubation environment.

Referring to the FIG. 1, the detector 17 comprises a temperature detector and a humidity detector; the controller 16 is provided in connection with the humidifier 5 through the USB power supply wire for supplying power.

Referring to the FIG. 9, a plurality of egg holders 222 for placing eggs 91 are evenly distributed on the turning plate 22.

The working principle is as follows: the staff opens the cover 11 and places the eggs 91 on the middle plate 23, each egg 92 is exactly corresponding to an egg holder 222 on the turning plate 22; the cover 11 is closed, and the water storage bottle 9 is filled with water and provided on the casing 62 of the water filling unit 6, and then the water storage bottle 9 is provided on the bottom case cover 61 upside down together with the casing 62; the supply power to the controller 16 through the power supply port 15, and the controller 16 works according to the temperature and humidity detected by the detector.

The fan 32 of the heating units 3 rotates while the heating wires 34 start heating, and the fan 32 blows the heated air out to raise the temperature near the eggs 91 to ensure an appropriate temperature environment.

The motor 41 of the rotating unit 4 drives the shaft connecting blocks 42, which are connected to the rotating base 221 and drive the turning plate 22, thus driving the rolling of the eggs 91, preventing the adhesion of the embryos to the eggshells of the eggs 91, and improving the hatching rate.

The controller 16 controls the work of the humidifier 5 according to the humidity detected by the detector 17.

When the water storage bottle 9 is provided on the bottom cover 61, the water storage bottle 9, the casing 62 and the plug 63 will fall under the action of gravity, and when they fall to a certain extent, the bottom of the plug 63 cannot continue to fall because it is in contact with the limiting post 181, while the casing 62 and the water storage bottle 9 can continue to fall; at this time, the sealing ring 64 is disconnected from the top of the casing 62, and the water in the water storage bottle 9 can continuously flow into the water tank 18 along the gap.

The water level in the water tank 18 continuously rises until its water level is equal to the water level opening 621 at the bottom of the casing 62, at which time the air can no longer continue to enter the water storage bottle 9, and the water in the water storage bottle 9 stops flowing down to achieve automatic water stop.

Before the water storage bottle 9 is provided into the bottom case cover 61, the springs 65 lift the plug 63 to allow a seal between the sealing ring 64 and the casing 62, preventing water from pouring out during the placement of the water storage bottle 9.

The invention claimed is:

1. An integrated incubator with automatic water filling and humidifying device, wherein comprises a bottom case (1), a cover (11) provided on the bottom case (1) and a top cover (12) provided on the cover (11); the top cover (12) is provided with a controller (16), a detector (17) is provided in the cover (11), a humidifier (5) for humidifying is provided on the bottom case (1), and a water-filling unit (6) for automatic water filling is provided on a side of the bottom case (1); the controller (16) is provided in connection with the detector (17) and the humidifier (5) respectively; the water filling unit (6) comprises a bottom case cover (61), a casing (62) provided on the bottom case cover (61) for installing a water storage bottle (9), a plug (63) provided in the casing (62) to move up and down and a limit post (181) correspondingly provided below the plug (63); the top of the plug (63) passes through the upper part of the casing (62) and is connected with a sealing ring (64); the plug (63) is provided with springs (65) positioned in the lower part of the casing (62); the upper part of the casing (62) corresponds to the sealing ring (64) to form a sealing structure, and the bottom of the casing (62) is provided with a water level opening (621) for water discharge.

2. The integrated incubator with automatic water filling and humidifying device according to claim 1, wherein the cover (11) is provided with heating units (3) for heating, a turntable (22) for placing the eggs (91) and a rotating unit (4) for driving the rotation of the turntable (22); the top cover (12) is provided with a controller (16), and the controller (16) is respectively provided in connection with the heating units (3) and the rotating unit (4).

3. The integrated incubator with automatic water filling and humidifying device according to claim 2, wherein an upper piece (21) for mounting the heating units (3) and the rotating units (4) is provided in a fixed position under the cover (11); the upper piece (21) is provided with a downward mounting groove (211) in middle and a number of guiding sheets (213) in upper part along circumference; side walls of the mounting groove (211) are provided with a number of air outlets (212).

4. The integrated incubator with automatic water filling and humidifying device according to claim 3, wherein the heating units (3) are provided on the mounting groove (211) and comprise a fan fixing holder (31), a fan (32) inside the fan fixing holder (31) and wire-winding posts (33) distributed on four corners of outside of the fan fixing holder (31); the wire-winding posts (33) and the fan fixing holder (31) are wound with heating wires (34).

5. The integrated incubator with automatic water filling and humidifying device according to claim 3, wherein the rotating unit (4) comprises a motor (41) provided in the mounting groove (211) and shaft connecting blocks (42) provided under the mounting groove (211) and in connection with the output shaft of the motor (41); the turntable (22) is provided with a rotating base (221) correspondingly connected to the shaft connecting blocks (42) in middle, and the shaft connecting blocks (42) and the rotating base (221) are provided in corresponding connection.

6. The integrated incubator with automatic water filling and humidifying device according to claim 2, wherein a plurality of egg holders (222) for placing eggs (91) are evenly distributed on the turntable (22).

7. The integrated incubator with automatic water filling and humidifying device according to claim 1, wherein the bottom case (1) is provided with a water tank (18) connected with the water-filling unit, and the humidifier (5) is located in middle of the bottom case (1) and is provided in the water tank (18); the water tank (18) is provided with a water tank cover (19); the limiting post (181) is provided in the water tank (18).

8. The integrated incubator with automatic water filling and humidifying device according to claim 1, wherein the bottom case (1) is provided with a middle plate (23) for mounting the turntable (22), and the middle of the middle plate (23) is provided with a mounting base (232) for corresponding to the turntable (22); the middle plate (23) is evenly provided with holes (231) for ventilation.

9. The integrated incubator with automatic water filling and humidifying device according to claim 1, wherein the top cover (12) is provided with an egg light (13) and a power supply port (15) connected to the controller (16); the cover (11) is made of transparent material and is provided above with an openable air release valve (14).

10. The integrated incubator with automatic water filling and humidifying device according to claim 1, wherein the detector (17) comprises a temperature detector and a humidity detector; the controller (16) is provided in connection with the humidifier (5) through a power supply wire for supplying power.

* * * * *